(12) United States Patent
Tao et al.

(10) Patent No.: US 12,718,619 B2
(45) Date of Patent: Aug. 25, 2026

(54) OBJECT AFFORDANCE DETECTION METHOD AND APPARATUS

(71) Applicant: BEIJING WODONG TIANJUN INFORMATION TECHNOLOGY CO., LTD., Beijing (CN)

(72) Inventors: Dacheng Tao, Beijing (CN); Wei Zhai, Beijing (CN)

(73) Assignee: BEIJING WODONG TIANJUN INFORMATION TECHNOLOGY CO., LTD., Beijing (CN)

( * ) Notice: Subject to any disclaimer, the term of this patent is extended or adjusted under 35 U.S.C. 154(b) by 283 days.

(21) Appl. No.: 18/549,745

(22) PCT Filed: Dec. 14, 2021

(86) PCT No.: PCT/CN2021/137832
§ 371 (c)(1),
(2) Date: Sep. 8, 2023

(87) PCT Pub. No.: WO2022/188493
PCT Pub. Date: Sep. 15, 2022

(65) Prior Publication Data

US 2024/0161546 A1 May 16, 2024

(30) Foreign Application Priority Data

Mar. 12, 2021 (CN) ......................... 202110269399.3

(51) Int. Cl.
*G06V 40/20* (2022.01)
*G06T 7/12* (2017.01)
(Continued)

(52) U.S. Cl.
CPC ................ *G06V 40/20* (2022.01); *G06T 7/12* (2017.01); *G06V 10/25* (2022.01); *G06V 10/44* (2022.01); *G06T 2207/30196* (2013.01)

(58) Field of Classification Search
CPC ........ G06V 40/20; G06V 10/25; G06V 10/44; G06V 10/82; G06V 10/764; G06V 20/41;
(Continued)

(56) References Cited

U.S. PATENT DOCUMENTS

2009/0164213 A1* 6/2009 Lennington ............ G06V 20/00
704/E15.001
2012/0188342 A1 7/2012 Gervautz et al.
(Continued)

FOREIGN PATENT DOCUMENTS

CN 105868917 A 8/2016
CN 111126218 A 5/2020
(Continued)

OTHER PUBLICATIONS

Xu et al., "Interact as You Intend: Intention-Driven Human-Object Interaction Detection", IEEE Transactions on Multimedia, vol. 22, No. 6, Jun. 2020 (Year: 2020).*
(Continued)

*Primary Examiner* — Qian Yang
(74) *Attorney, Agent, or Firm* — Myers Bigel, P.A.

(57) ABSTRACT

The present disclosure relates to the field of computers, and provides an object affordance detection method and apparatus. The method includes acquiring a reference image and an image to be detected, the reference image comprising a person and a first object on which the person performs an action; extracting features of the reference image and features of the image to be detected; according to the feature of the reference image, extracting action intent information of the person on the first object in the reference image; according to the action intent information of the person on the first object in the reference image and the features of the image to be detected, migrating the action intent information to the image to be detected, and segmenting, from the image to be
(Continued)

detected, a second object capable of completing the action intent information.

14 Claims, 6 Drawing Sheets

(51) Int. Cl.
*G06V 10/25* (2022.01)
*G06V 10/44* (2022.01)

(58) Field of Classification Search
CPC ........ G06V 20/44; G06V 40/10; G06V 10/26; G06V 10/454; G06V 10/774; G06T 7/12; G06T 2207/30196; G06T 2210/12; G06N 3/0455; G06N 3/09; G06N 3/04; G06N 3/0464; G06N 3/08
See application file for complete search history.

(56) References Cited

U.S. PATENT DOCUMENTS

| | | | | |
|---|---|---|---|---|
| 2014/0280179 | A1 | 9/2014 | Coleman | |
| 2020/0036810 | A1 | 1/2020 | Howard | |
| 2020/0302232 | A1* | 9/2020 | Kilickaya | G06N 7/01 |
| 2020/0327409 | A1 | 10/2020 | Kim et al. | |
| 2021/0004589 | A1* | 1/2021 | Turkelson | G06V 10/809 |

FOREIGN PATENT DOCUMENTS

| | | | |
|---|---|---|---|
| CN | 111399731 | A | 7/2020 |
| CN | 111914622 | A | 11/2020 |
| CN | 112949501 | A | 6/2021 |
| EP | 3869411 | A1 | 8/2021 |
| KR | 20130122660 | A | 11/2013 |
| KR | 20200074940 | A | 6/2020 |
| KR | 20200077321 | A | 6/2020 |
| WO | 2021022816 | A1 | 2/2021 |

OTHER PUBLICATIONS

Mi et al., "Intention-Related Natural Language Grounding via Object Affordance Detection and Intention Semantic Extraction" Frontiers in Neurorobotics (Year: 2020).*

"Notice of the First Examination Opinion" and English language translation, CN Application No. 202110269399.3, Sep. 24, 2024, 12 pp.

Notice of Grant of Invention Patent Rights with English language translation, CN Application No. 202110269399.3, May 7, 2025, 8 pp.

Xue, Zhao, "Object Affordance Learning Based on Relation Perception", (Publication No. Y3723049) [Master's dissertation, University of Science and Technology of China], May 2020, 78 pp.

"International Search Report and Written Opinion of the International Searching Authority", with English language translation, International Application No. PCT/CN2021/137832, Mar. 10, 2022, 13 pp.

Notice of Rejection Reason with English Translation, JP Application 2023-555623, Aug. 5, 2025, 4 pp.

Notice of Allowance with English language translation, KR Application No. 10-2023-7032130, Jun. 10, 2026, 5 pp.

* cited by examiner

OBJECT AFFORDANCE DETECTION METHOD AND APPARATUS

CROSS-REFERENCE TO RELATED APPLICATIONS

This application is a U.S. National Stage application under 35 U.S.C. § 371 of International Patent Application No PCT/CN2021/137832, filed on Dec. 14, 2021, which itself is based on and claims the priority to the Chinese patent application No. 202110269399.3 filed on Mar. 12, 2021, the disclosures of both of which are hereby incorporated in their entireties into the present application.

TECHNICAL FIELD

This disclosure relates to the field of computers, and in particular, to an object affordance detection method and apparatus.

BACKGROUND

Affordance was proposed by a psychologist Gibson in 1966. It describes how to directly perceive an intrinsic value and meaning of an object in an environment, and explains how this information correlates with an action possibility of an organism provided by the environment.

In an practical application, perceiving affordance of each object in an unknown environment is very important, and has an important application value in aspects such as scene understanding, action recognition, and human-computer interaction.

SUMMARY

Some embodiments of the present disclosure provide an object affordance detection method, comprising:

acquiring a reference image and an image to be detected, the reference image comprising a person and a first object on which the person performs an action;

extracting features of the reference image and features of the image to be detected;

extracting action intention information of the person on the first object in the reference image according to the features of the reference image; and migrating the action intention information to the image to be detected and segmenting a second object capable of completing the action intention information from the image to be detected according to the action intention information of the person on the first object in the reference image and the features of the image to be detected.

In some embodiments, the extracting action intention information of the person on the first object in the reference image comprises:

performing weighted operation on the features of the reference image according to a feature representation of the person in the reference image to obtain a first output;

performing weighted operation on the features of the reference image according to a feature representation of the first object in the reference image to obtain a second output;

obtaining a third output describing a related position of the action of the person on the first object according to the feature representation of the person and the feature representation of the first object in the reference image; and determining action intention code of the person on the first object in the reference image according to the first output, the second output, and the third output.

In some embodiments, the performing weighted operation on the features of the reference image according to a feature representation of the person in the reference image to obtain a first output comprises: performing a correlation operation on the pooled feature representation of the person in the reference image and each position of the features of the reference image, normalizing a result of the correlation operation to obtain a weight of each position, and performing multiplication on the weight of each position and the features of the reference image to obtain the first output.

In some embodiments, the performing weighted operation on the features of the reference image according to a feature representation of the first object in the reference image to obtain a second output comprises: performing a correlation operation on the pooled feature representation of the first object in the reference image and each position of the features of the reference image, normalizing a result of the correlation operation to obtain a weight of each position, and performing multiplication on the weight of each position and the features of the reference image to obtain the second output.

In some embodiments, the obtaining a third output describing a related position of the action of the person on the first object according to the feature representation of the person and the feature representation of the first object in the reference image comprises: performing a correlation operation on the pooled feature representation of the first object and the feature representation of the person, performing a convolutional processing of a result of the correlation operation to obtain the third output describing the related position of the action of the person on the first object.

In some embodiments, the determining action intention code of the person on the first object in the reference image according to the first output, the second output, and the third output comprises:

performing multiplication and pooling on the third output and the first output to obtain first action intention sub-information;

performing multiplication and pooling on the third output and the second output to obtain second action intention sub-information; and adding the first action intention sub-information and the second action intention sub-information to obtain the action intention code of the person on the first object in the reference image.

In some embodiments, the feature representation of the person in the reference image is obtained by performing multiplication on a bounding box of the person in the reference image and the features of the reference image; and the feature representation of the first object in the reference image is obtained by performing multiplication on a bounding box of the first object in the reference image and the features of the reference image.

In some embodiments, the migrating the action intention information to the image to be detected and segmenting a second object capable of completing the action intention information from the image to be detected according to the action intention information of the person on the first object in the reference image and the features of the image to be detected comprises:

performing a correlation operation on the action intention information of the person on the first object in the reference image and each position of the features of the image to be detected, and performing normalization to obtain a weight of each position; and performing multiplication on the weight of each position and the features of the image to be detected, and adding a result of the multiplication and the features of the image to be detected to obtain the second object which is segmented from the image to be detected and capable of completing the action intention information.

In some embodiments, the method further comprises:

performing reconstruction on a first feature of the second object by using one set of bases, the set of bases being capable of capturing a common feature between different objects with one same affordance;

determining a second feature of the second object according to the first feature of the second object and the reconstructed first feature of the second object; and outputting an image of the second object according to the second feature of the second object.

In some embodiments, an acquisition method for the set of bases comprises: randomly initializing one set of bases, by using a preset optimization algorithm, iteratively updating the set of bases by reducing difference information between a training image and a training image after correlation operation using the set of bases, and taking the updated set of bases as one set of bases which is learned and capable of capturing the common feature between different objects with one same affordance, wherein the optimization algorithm comprises an expectation-maximum algorithm or a gradient descent algorithm.

Some embodiments of the present disclosure provide an object affordance detection apparatus, characterized by comprising: a memory; and a processor coupled to the memory, the processor being configured to perform, based on instructions stored in the memory, the object affordance detection method.

Some embodiments of the present disclosure provide an object affordance detection apparatus, characterized by comprising:

a feature extraction module configured to acquire a reference image and an image to be detected, the reference image comprising a person and a first object on which the person performs an action; and extract features of the reference image and features of the image to be detected;

an intention learning module configured to extract action intention information of the person on the first object in the reference image according to the features of the reference image; and an intention migration module configured to migrate the action intention information to the image to be detected and segment a second object capable of completing the action intention information from the image to be detected according to the action intention information of the person on the first object in the reference image and the features of the image to be detected.

In some embodiments, the apparatus further comprises: a synergetic enhancement module configured to perform reconstruction on a first feature of the second object by using one set of bases, the set of bases being capable of capturing a common feature between different objects with one same affordance; and determine a second feature of the second object according to the first feature of the second object and the reconstructed first feature of the second object; and a decoding module configured to output an image of the second object according to the second feature of the second object.

Some embodiments of the present disclosure provide a non-transitory computer-readable storage medium having thereon stored a computer program which, when executed by a processor, implements the steps of the object affordance detection method.

BRIEF DESCRIPTION OF THE DRAWINGS

The drawings that need to be used in the description of the embodiments or the related art will be briefly described below. The present disclosure can be more clearly understood according to the following detailed description, which proceeds with reference to the accompanying drawings.

It is apparent that the drawings in the following description are merely some embodiments of this disclosure and for one of ordinary skill in the art, other drawings can be obtained without paying creative efforts.

DETAILED DESCRIPTION

The technical solutions in the embodiments of the present disclosure will be clearly and completely described below with reference to the drawings in the embodiments of the present disclosure.

Unless specifically stated otherwise, the expressions such as “first”, “second” in this disclosure are used for distinguishing different objects, rather than indicating meanings such as magnitude or time sequence.

According to the embodiments of the present disclosure, an action intention of a person on an object is captured based on a reference image comprising the person and the object, and the action intention is migrated to all images to be detected, from which all objects capable of completing the action intention are segmented, so that a capability of detecting affordance of “unseen” objects is improved. In addition, a common feature (namely, an intrinsic relation) between different objects with same affordance is captured by a synergetic method, and various objects with this affordance are detected based on the common feature, so that robustness of object affordance detection is improved.

The "unseen" objects refer to objects that have not been "seen" by an object affordance detection model, namely, objects that have not been learned by the object affordance detection model.

Figure 1:
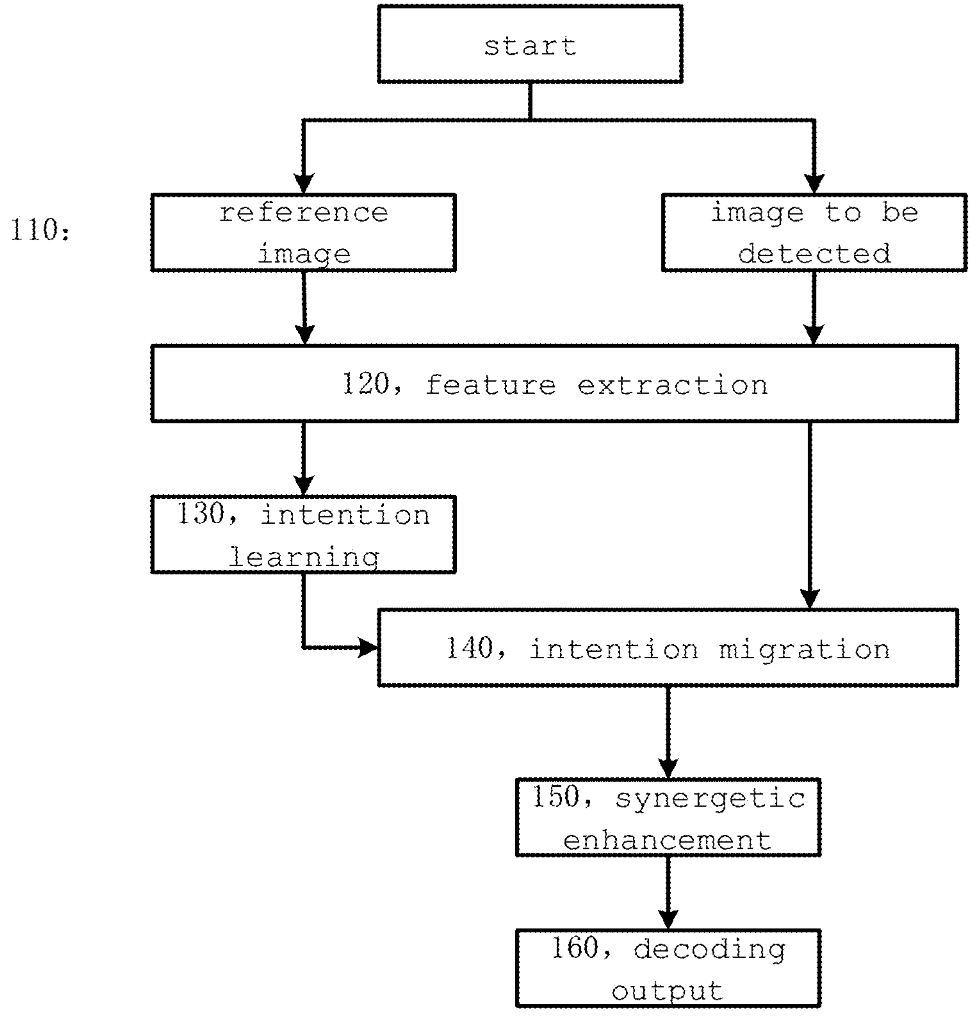
FIG. 1 illustrates a schematic flow diagram of an object affordance detection method according to some embodiments of the present disclosure.

FIG. 1 illustrates a schematic flow diagram of an object affordance detection method according to some embodiments of the present disclosure.

As shown in FIG. 1, the object affordance detection method of this embodiment comprises: steps 110 to 160, in which the step 150 can be selectively executed as needed.

At the step 110, an image acquisition step: acquiring a reference image (namely Support image) and an image to be detected (namely query image).

The reference image comprises a person and a first object on which the person performs an action, and can be marked with a bounding box of the person and a bounding box of the first object. For example, a reference image of "a person kicks a ball" comprises "the person" kicking the ball and "the ball" kicked by the person, and is marked with a rectangular box of "the person" and a rectangular box of "the ball".

The image to be detected can be one or more, and if there are multiple images to be detected, an affordance detection operation that is the same as one performed on one image to be detected is performed on each image to be detected.

At the step 120, a feature extraction step: extracting features of the reference image and features of the image to be detected.

By using an image feature extraction network, such as Resnet (Residual Network) and VGGnet, the features of the reference image/image to be detected are extracted.

At the step 130, an intention learning step: extracting action intention information of the person on the first object in the reference image according to the features of the reference image.

Figure 2:
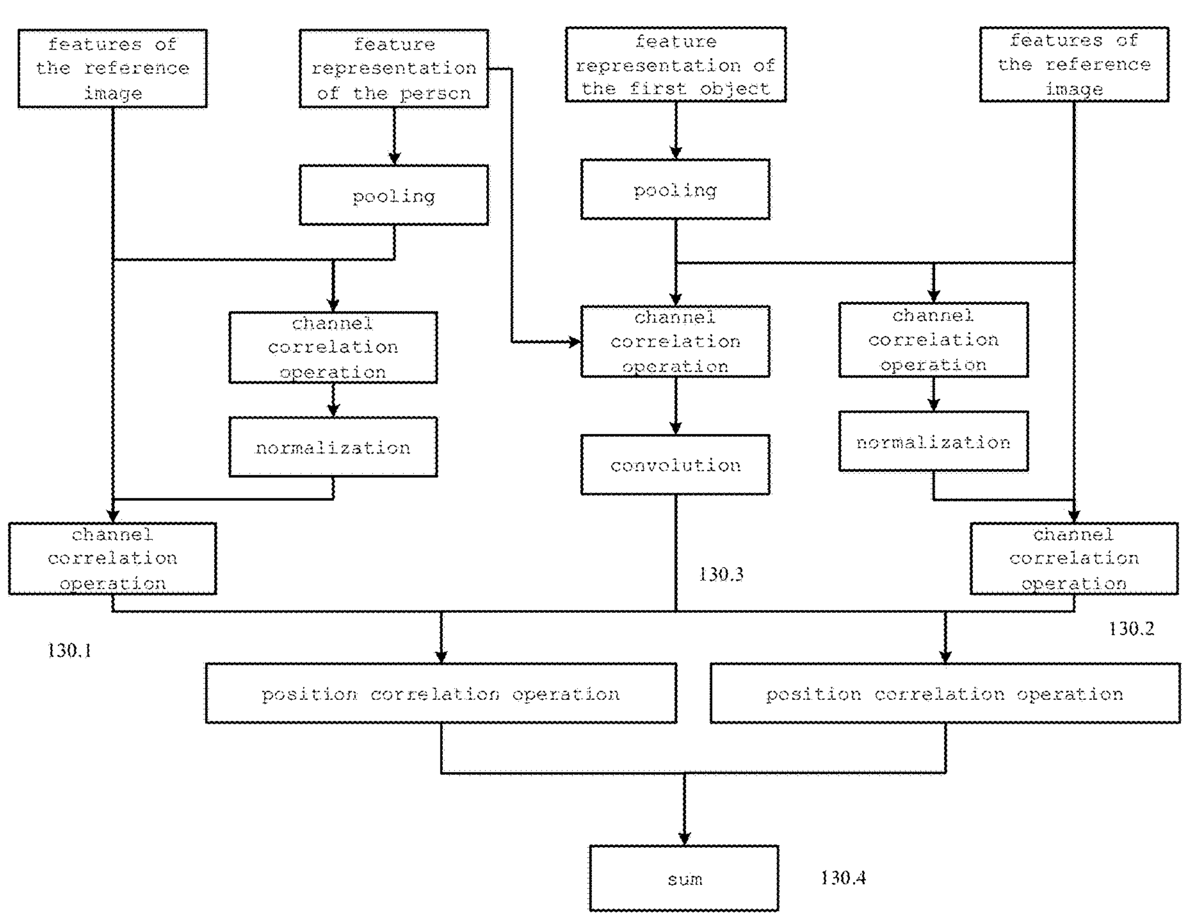
FIG. 2 illustrates a schematic diagram of extracting action intention information of a person on a first object in a reference image according to some embodiments of the present disclosure.

In some embodiments, the extracting action intention information of the person on the first object in the reference image comprises: steps 130.1 to 130.4, as shown in FIG. 2.

At the step 130.1, weighted operation on the features of the reference image is performed according to a feature representation of the person in the reference image, to obtain a first output.

Multiplication on the bounding box of the person in the reference image and the features of the reference image is performed to obtain the feature representation of the person in the reference image.

In some embodiments, the performing weighted operation on the features of the reference image according to a feature representation of the person in the reference image to obtain a first output comprises: performing a correlation operation (such as Element-wise Multiplication) on the pooled (such as Global Average Pooling) feature representation of the person in the reference image and each position of the features of the reference image, normalizing (such as Softmax method) a result of the correlation operation to obtain a weight of each position, and performing multiplication (such as Element-wise Multiplication) on the weight of each position and the features of the reference image to obtain the first output.

Each position of the features of the image can be, for example, each pixel position of the image, correspondingly, each position of the features of the reference image can be each pixel position of the reference image, and each position of the features of the image to be detected can be each pixel position of the image to be detected.

At the step 130.2, weighted operation on the features of the reference image is performed according to a feature representation of the first object in the reference image, to obtain a second output.

Multiplication on the bounding box of the first object in the reference image and the features of the reference image is performed to obtain the feature representation of the first object in the reference image.

In some embodiments, the performing weighted operation on the features of the reference image according to a feature representation of the first object in the reference image to obtain a second output comprises: performing a correlation operation (such as Element-wise Multiplication) on the pooled (such as Global Average Pooling) feature representation of the first object in the reference image and each position of the features of the reference image, normalizing (such as a Softmax method) a result of the correlation operation to obtain a weight of each position, and performing multiplication (such as Element-wise Multiplication) on the weight of each position and the features of the reference image to obtain the second output.

At the step 130.3, a third output describing a related position of the action of the person on the first object is obtained according to the feature representation of the person and the feature representation of the first object in the reference image.

In some embodiments, the obtaining a third output describing a related position of the action of the person on the first object according to the feature representation of the person and the feature representation of the first object in the reference image comprises: performing a correlation operation (such as Element-wise Multiplication) on the pooled (such as Global Average Pooling) feature representation of the first object and the feature representation of the person, so that the related position of the action of the person on the first object in the reference image is followed with interest, performing a convolutional processing (cony, such as 1*1 or 3*3 convolution) of a result of the correlation operation to obtain the third output describing the related position of the action of the person on the first object. The third output is one feature map of 1*H*W, where H is a height of a feature map of the reference image and W is a width of the feature map of the reference image.

At the step 130.4, action intention code of the person on the first object in the reference image is determined according to the first output, the second output, and the third output.

In some embodiments, the determining action intention code of the person on the first object in the reference image according to the first output, the second output, and the third output comprises: performing multiplication (such as Position-wise Dot Product) and pooling on the third output and the first output to obtain first action intention sub-information; performing multiplication (such as Position-wise Dot Product) and pooling on the third output and the second output to obtain second action intention sub-information; and performing sum on the first action intention sub-information and the second action intention sub-information to obtain the action intention code of the person on the first object in the reference image.

Figure 3:
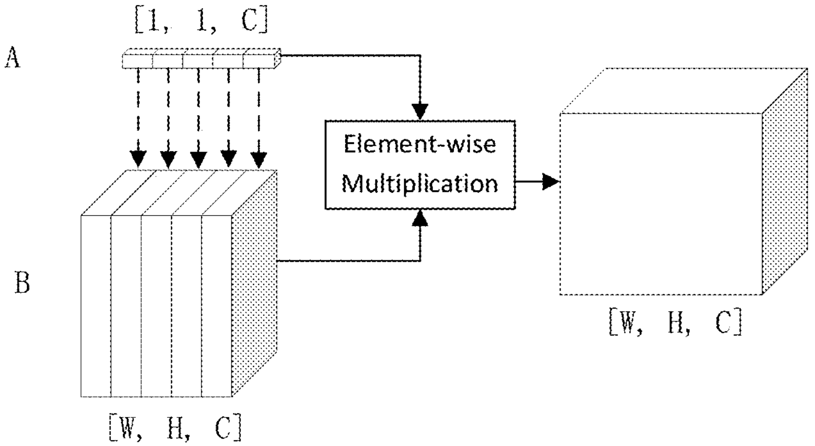
FIG. 3 illustrates a schematic diagram of an Element-wise Multiplication process according to some embodiments of the present disclosure.

As shown in FIG. 3, an Element-wise Multiplication process is as follows: inputting two matrixes A([1, 1, C]) and B([W, H, C]), and performing multiplication on the third dimension (i.e., Channel, C) of A and B, i.e., multiplication on corresponding channels of A and B, also called "channel correlation operation".

Figure 4:
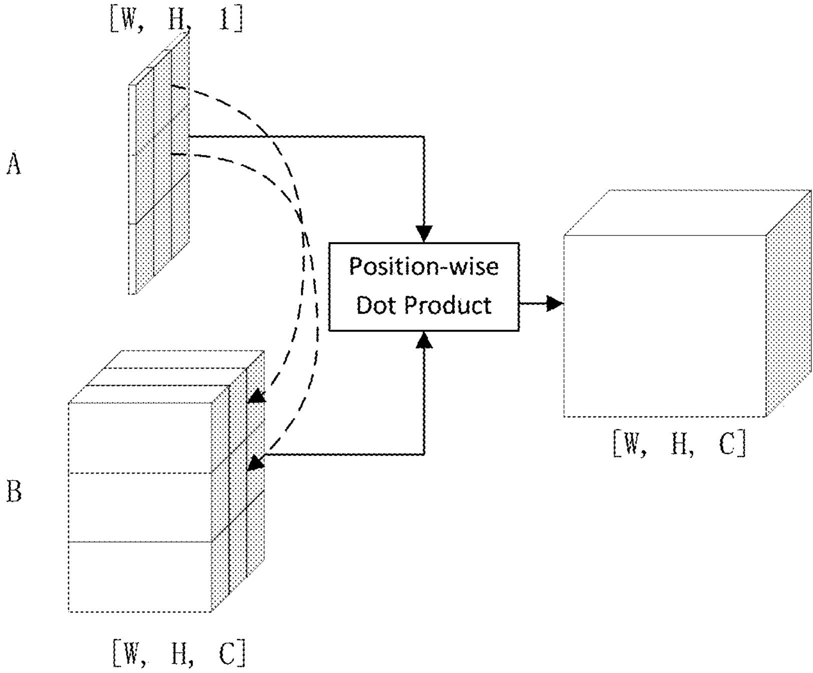
FIG. 4 illustrates a schematic diagram of a Position-wise Dot Product process according to some embodiments of the present disclosure.

As shown in FIG. 4, a Position-wise Dot Product process is as follows: inputting two matrixes A([W, H, 1]) and B([W, H, C]), and performing multiplication on first 2 dimensions of A and B, wherein the first 2 dimensions respectively represent a height (H) and a width (W) of a feature map matrix, i.e. multiplication on corresponding positions of A and B, also called "position correlation operation".

At the step 140, an intention migration step: migrating the action intention information to the image to be detected and segmenting a second object (a first feature of the second object) capable of completing the action intention information from the image to be detected according to the action intention information of the person on the first object in the reference image and the features of the image to be detected.

Figure 5:
FIG. 5 illustrates a schematic diagram of migrating action intention information to an image to be detected and segmenting a second object capable of completing the action intention information from the image to be detected according to some embodiments of the present disclosure.
Figure 5:
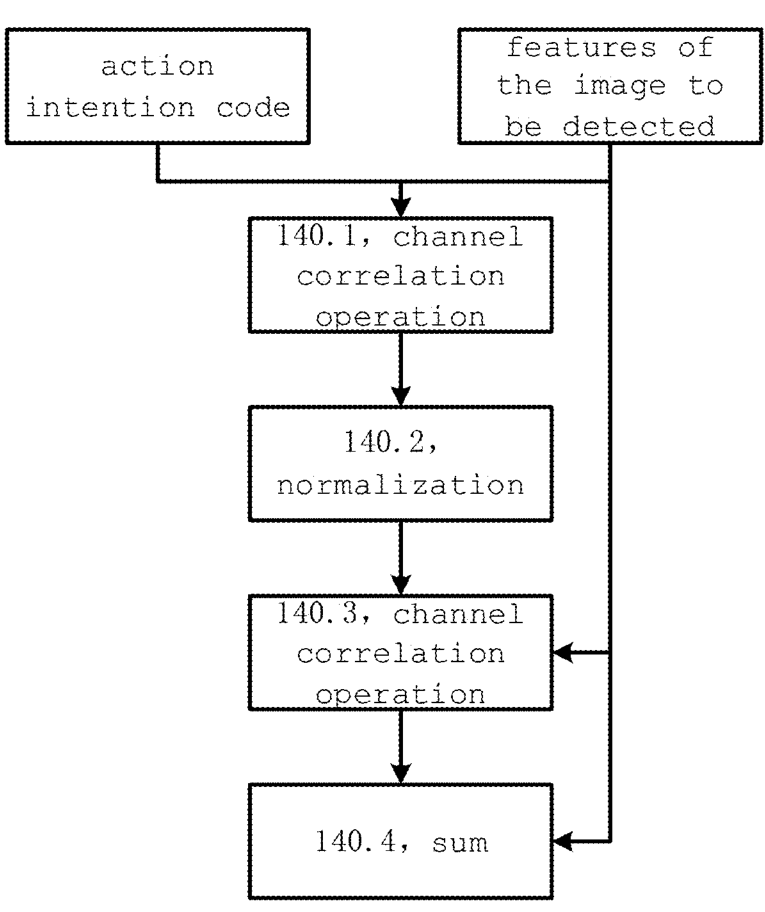

In some embodiments, as shown in FIG. 5, the migrating the action intention information to the image to be detected, and segmenting a second object capable of completing the action intention information from the image to be detected, comprises: by using the action intention information (i.e., the action intention code) of the person on the first object in the reference image, performing correlation operation (such as Element-wise Multiplication) with each position of the features of the image to be detected (step 140.1), performing normalization (such as a Softmax method) to obtain a weight of each position (step 140.2); performing multiplication (such as Element-wise Multiplication) on the weight of each position and the features of the image to be detected (step 140.3), and performing sum on the multiplication result and the features of the image to be detected (step 140.4), to obtain the second object (the first feature of the second object) which is segmented from the image to be detected and capable of completing the action intention information, that is, to obtain a feature of a related area activated by the action intention information.

That different objects can complete the same action intention means that these different objects have one same affordance corresponding to this action intention.

At the step 150, a synergetic enhancement step: performing reconstruction on a first feature of the second object by using one set of bases, wherein the set of bases is capable of capturing a common feature between different objects with one same affordance, and determining a second feature of the second object according to the first feature of the second object and the reconstructed first feature of the second object.

Figure 6:
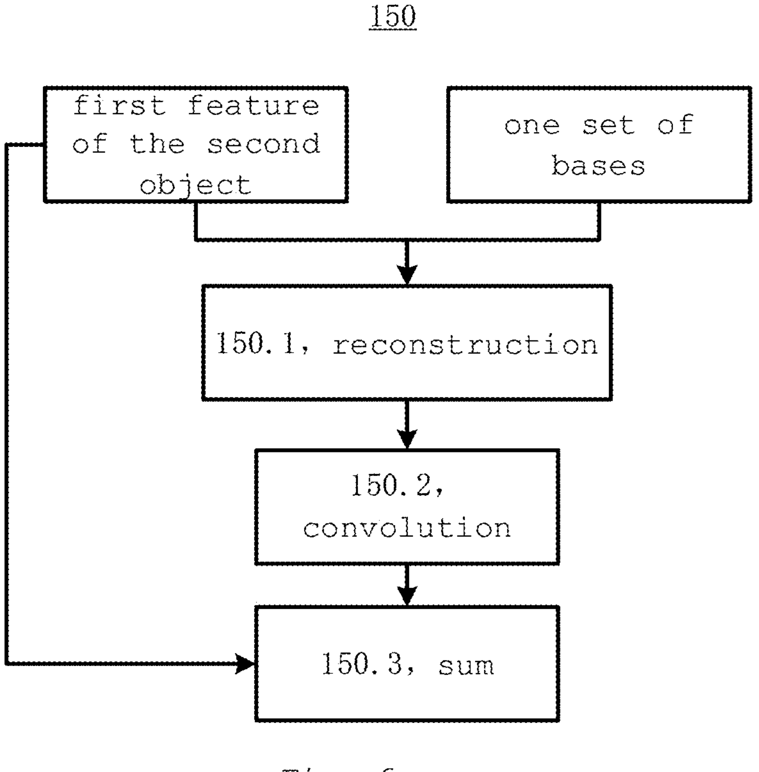
FIG. 6 illustrates a schematic diagram of a synergetic enhancement step according to some embodiments of the present disclosure.

In some embodiments, as shown in FIG. 6, the synergetic enhancement step specifically comprises: performing correlation operation (such as Position-wise Dot Product) on the first feature of the second object and the set of bases to perform reconstruction (step 150.1), and after the reconstructed first feature of the second object is subjected to convolution (cony) (step 150.2), performing sum with the first feature of the second object (step 150.3) to obtain the second feature of the second object.

The set of bases is capable of capturing an intrinsic relation (embodied by the common feature) between different objects with one same affordance, and suppressing an unrelated background area in a detection process based on the set of bases, so that a better detection effect is obtained.

An acquisition method for the set of bases comprises: randomly initializing one set of bases, by using a preset optimization algorithm, iteratively updating the set of bases by continuously reducing difference information between a training image and a training image after correlation operation (such as Position-wise Dot Product) using the set of bases, and taking the updated set of bases as one set of bases which is learned and capable of capturing the common feature between different objects with one same affordance. The optimization algorithm comprises an expectation-maximum (EM) algorithm or a gradient descent algorithm. A number of bases in the set is typically much less than product of a height (H) and width (W) of the image. The number of bases in the set is, for example, a few or a dozen.

For example, one set of bases is initialized randomly, each base is in a form of [1, 1, C], where C represents a channel, correlation operation (such as Position-wise Dot Product) on each base and features of a training image with dimensions of [W, H, C] is performed, where W and H represent a width and height of a feature map of the training image respectively, correlation operation results corresponding to the plurality of bases are combined to obtain features of the training image after the correlation operation using the set of bases; the features of the training image after the correlation operation are subjected to convolution to convert into features with dimensions of [W, H, C], the set of bases is iteratively updated by using the expectation-maximum optimization method, so that a difference between the features of the training image and the features of the training image after the correlation operation and the convolution is reduced continuously, until a preset number of iterations is reached or the difference is less than a preset value, and the iteration is stopped. The updated set of bases is one set of bases which is learned and capable of capturing the common feature between different objects with one same affordance.

At the step 160, a decoding output step: by decoding, outputting an image of the second object.

If it is after the step 140, the image of the second object is output by decoding according to the first feature of the second object. If it is after the step 150, the image of the second object is output by decoding according to the second feature of the second object.

The so-called decoding is that features of an image are restored to a corresponding image. The decoding can be implemented, for example, by deconvolution, or by upsampling first and then convolution.

In the above embodiments, the action intention of the person on the object is captured based on the reference image comprising the person and the object, and the action intention is migrated to all images to be detected, from which all objects capable of completing the action intention are segmented, so that a capability of detecting affordance of unseen objects is improved. In addition, in the above embodiments, the common feature (namely, the intrinsic relation) between different objects with one same affordance is captured by the synergetic method, and various objects with this affordance are detected based on the common feature, so that robustness of object affordance detection is improved.

In some application examples, for example, given a reference image of "a person kicks a ball", an action intention of "a person kicks a ball" is captured from the reference image, based on the action intention of "a person kicks a ball" captured from the reference image, the action intention is migrated to all images to be detected, from which all spherical objects meeting the action intention are segmented, so that a capability of detecting affordance of unseen objects is improved; a common feature between different objects meeting the action intention, such as an arc appearance, can also be captured by means of the synergetic method, and various objects meeting the action intention are detected based on the common feature, so that robustness of object affordance detection is improved.

Figure 7:
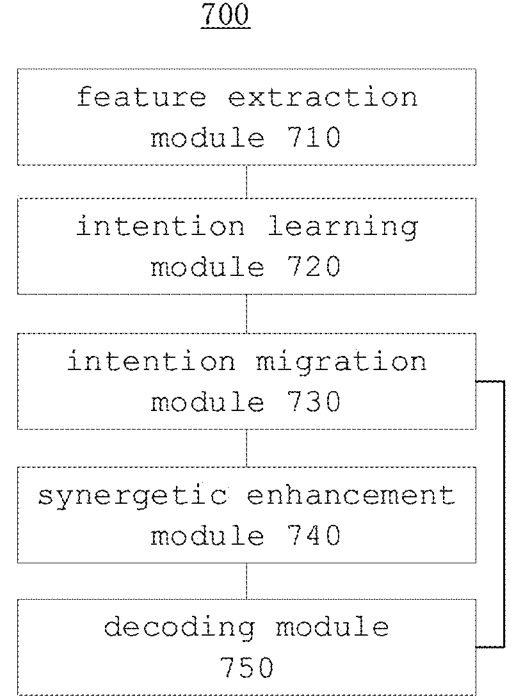
FIG. 7 illustrates a schematic diagram of an object affordance detection apparatus according to some embodiments of the present disclosure.

FIG. 7 illustrates a schematic diagram of an object affordance detection apparatus according to some embodiments of the present disclosure. The object affordance detection apparatus is also referred to as an object affordance detection network.

As shown in FIG. 7, the object affordance detection apparatus 700 of this embodiment comprises: modules 710 to 750, wherein the module 740 is selectively configured or executed.

The feature extraction module 710 is configured to acquire a reference image and an image to be detected, the reference image comprising a person and a first object on which the person performs an action; and extract features of the reference image and features of the image to be detected.

The intention learning module 720 is configured to extract action intention information of the person on the first object in the reference image according to the features of the reference image.

The intention migration module 730 is configured to migrate the action intention information to the image to be detected and segment a second object(a first feature of the second object) capable of completing the action intention information from the image to be detected according to the action intention information of the person on the first object in the reference image and the features of the image to be detected.

The decoding module 750 is configured to output an image of the second object according to the first feature of the second object.

In some embodiments, the object affordance detection apparatus 700 further comprises: a synergetic enhancement module 740 configured to perform reconstruction on a first feature of the second object by using one set of bases, the set of bases being capable of capturing a common feature between different objects with one same affordance; and determine a second feature of the second object according to the first feature of the second object and the reconstructed first feature of the second object. At this time, the decoding module 750 is configured to output an image of the second object according to the second feature of the second object.

For specific processing of the operations executed by the above modules, reference can be made to the foregoing embodiments, which are not repeated here.

The object affordance detection apparatus 700 needs to be trained before used, but the object affordance detection apparatus 700 can be pre-trained and directly used.

A training process of the object affordance detection apparatus 700 comprises: acquiring a data set; dividing the data set into a training set and a test set, wherein the training set and the test set both comprise the reference image and the image to be detected, and one reference image can correspond to one or more images to be detected; the reference image in the training set being marked with bounding boxes of the person and the first object, and the image to be detected in the training set being pre-marked with the second object capable of meeting the action intention of the person on the first object in the reference image; and inputting the reference image and the image to be detected in the training set into the object affordance detection apparatus 700 for detection, a detected object being set as a third object, determining loss according to difference information between the detected third object and the pre-marked second object and a loss function (such as cross entropy), and performing optimization on network parameters (such as various parameters in convolution in the modules) in the detection apparatus 700 by using an optimization function (such as adam and sgd (Stochastic Gradient Descent), so that the loss is reduced to a certain extent and the training is completed. Then, the trained detection apparatus 700 is tested by using the test set. The reference image in the test set is marked with bounding boxes of the person and the first object, the image to be detected in the test set is pre-marked with the second object capable of meeting the action intention of the person on the first object in the reference image, and the reference image and the image to be detected in the test set are input into the object affordance detection apparatus 700 for detection, a detected object is set as a third object, accuracy of the detection is determined according to whether the detected third object belongs to the pre-marked second object, and if the accuracy of the detection is higher than a certain degree, it is considered that the detection apparatus 700 has passed the test and is qualified. If the detection apparatus 700 has not passed the test, the training of the detection apparatus 700 can be continued by increasing training samples or increasing a number of iterations of the training. When training, for example, data including ⅓ of affordance categories are selected as the test set, and data of remaining affordance categories are taken as the training set for the training, to improve the training effect.

Figure 8:
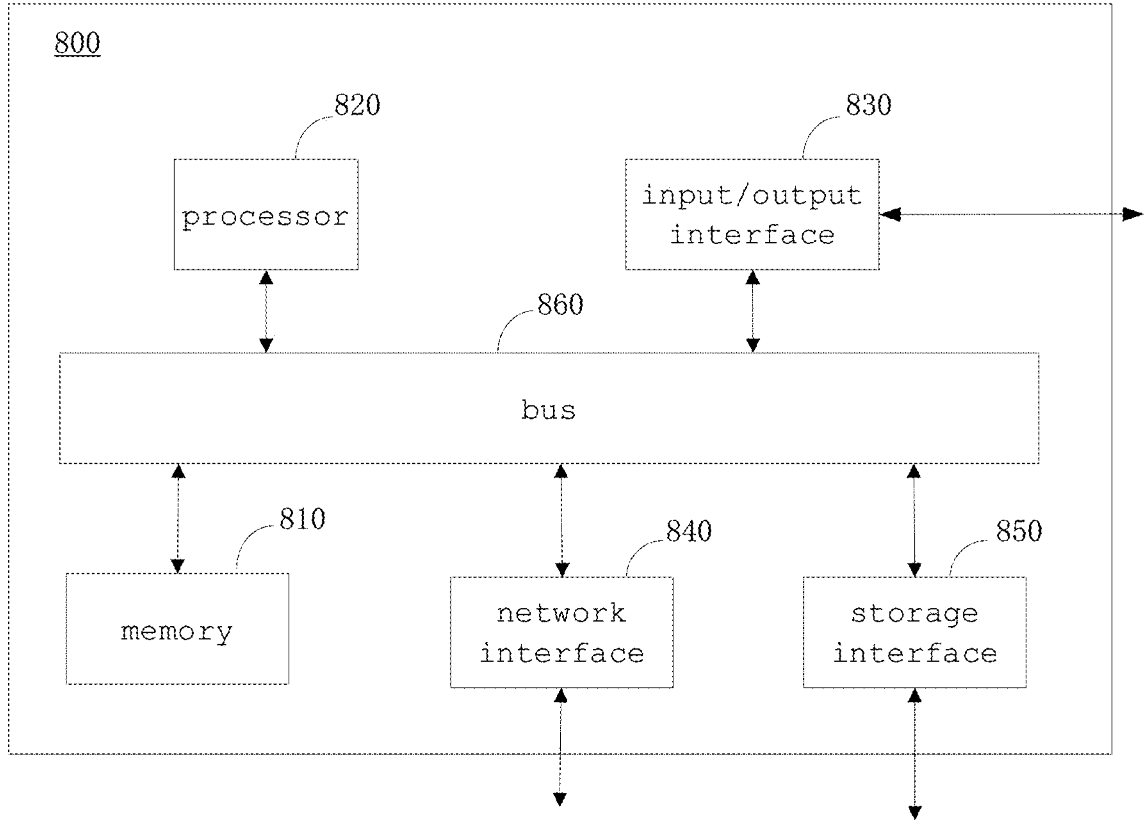
FIG. 8 illustrates a schematic diagram of an object affordance detection apparatus according to other embodiments of the present disclosure.

FIG. 8 illustrates a schematic diagram of an object affordance detection apparatus according to other embodiments of the present disclosure.

As shown in FIG. 8, the object affordance detection apparatus 800 of this embodiment comprises: a memory 810 and a processor 820 coupled to the memory 810, the processor 820 being configured to perform, based on instructions stored in the memory 810, the object affordance detection method in any of the foregoing embodiments.

The memory 810 can comprise, for example, a system memory, fixed non-volatile storage medium, and the like. The system memory has thereon stored, for example, an operating system, an application program, a boot loader, other programs, and the like.

The detection apparatus 800 can further comprise an input/output interface 830, a network interface 840, a storage interface 850, and the like. These interfaces 830, 840, 850, as well as the memory 810, can be connected with the processor 820, for example, via a bus 860. The input/output interface 830 provides a connection interface for input/output devices such as a display, a mouse, a keyboard, and a touch screen. The network interface 840 provides a connection interface for a variety of networking devices. The storage interface 850 provides a connection interface for external storage devices such as an SD card and a USB flash disk.

Some embodiments of the present disclosure provide a non-transitory computer-readable storage medium having thereon stored a computer program which, when executed by a processor, implements the steps of the object affordance detection method in any of the foregoing embodiments.

It should be appreciated by those skilled in the art that the embodiments of the present disclosure can be provided as a method, system, or computer program product. Accordingly, the present disclosure can take a form of an entire hardware embodiment, an entire software embodiment, or an embodiment combining software and hardware aspects. Furthermore, the present disclosure can take a form of a computer program product implemented on one or more non-transitory computer-readable storage media (including, but not limited to, a disk memory, CD-ROM, optical memory, etc.) having computer program code embodied therein.

The present disclosure is described with reference to flow diagrams and/or block diagrams of the method, apparatus (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed via the processor of the computer or other programmable data processing devices, create means for implementing functions specified in one or more flows of the flow diagrams and/or one or more blocks of the block diagrams.

These computer program instructions can also be stored in a computer-readable memory that can guide a computer or other programmable data processing devices to work in a specific manner, such that the instructions, which are stored in the computer-readable memory, produce an article of manufacture including instruction means which implement functions specified in one or more flows of the flow diagrams and/or one or more blocks of the block diagrams.

These computer program instructions can also be loaded onto a computer or other programmable data processing devices to cause a series of operational steps to be performed on the computer or other programmable devices to produce a computer-implemented process, such that the instructions, which are executed on the computer or other programmable devices, provide steps for implementing functions specified in one or more flows of the flow diagrams and/or one or more blocks of the block diagrams.

The above descriptions are merely preferred embodiments of the present disclosure and not used for limiting this disclosure, and any modifications, equivalent replacements, improvements and the like that are made within the spirit and principle of the present disclosure should be included in the protection scope of the present disclosure.

What is claimed is:

1. An object affordance detection method, comprising:

acquiring a reference image and an image to be detected, the reference image comprising a person and a first object on which the person performs an action;

extracting features of the reference image and features of the image to be detected by using an image feature extraction network;

extracting action intention information of the person on the first object in the reference image according to the features of the reference image, comprising:

performing weighted operation on the features of the reference image according to a feature representation of the person in the reference image to obtain a first output;

performing weighted operation on the features of the reference image according to a feature representation of the first object in the reference image to obtain a second output;

performing a correlation operation on a pooled feature representation of the first object and the feature representation of the person, performing a convolutional processing of a result of the correlation operation to obtain a third output describing a related position of the action of the person on the first object;

performing multiplication and pooling on the third output and the first output to obtain first action intention sub-information;

performing multiplication and pooling on the third output and the second output to obtain second action intention sub-information; and adding the first action intention sub-information and the second action intention sub-information to obtain an action intention code of the person on the first object in the reference image; and migrating the action intention information to the image to be detected and segmenting a second object capable of completing the action intention information from the image to be detected according to the action intention information of the person on the first object in the reference image and the features of the image to be detected, comprising:

performing a correlation operation on the action intention information of the person on the first object in the reference image and each position of the features of the image to be detected, and performing normalization to obtain a weight of each position; and performing multiplication on the weight of each position and the features of the image to be detected, and adding a result of the multiplication and the features of the image to be detected to obtain the second object which is segmented from the image to be detected and capable of completing the action intention information, wherein the second object is an object that has not been learned by an object affordance detection model, and is applied to scene understanding, action recognition, or human-computer interaction.

2. The method according to claim 1, wherein the performing weighted operation on the features of the reference image according to a feature representation of the person in the reference image to obtain a first output comprises:

performing a correlation operation on a pooled feature representation of the person in the reference image and each position of the features of the reference image, normalizing a result of the correlation operation to obtain a weight of each position, and performing multiplication on the weight of each position and the features of the reference image to obtain the first output.

3. The method according to claim 1, wherein the performing weighted operation on the features of the reference image according to a feature representation of the first object in the reference image to obtain a second output comprises:

performing a correlation operation on the pooled feature representation of the first object in the reference image and each position of the features of the reference image, normalizing a result of the correlation operation to obtain a weight of each position, and performing multiplication on the weight of each position and the features of the reference image to obtain the second output.

4. The method according to claim 1, wherein:

the feature representation of the person in the reference image is obtained by performing multiplication on a bounding box of the person in the reference image and the features of the reference image; and the feature representation of the first object in the reference image is obtained by performing multiplication on a bounding box of the first object in the reference image and the features of the reference image.

5. The method according to claim 1, further comprising:

performing reconstruction on a first feature of the second object by using one set of bases, the set of bases being capable of capturing a common feature between different objects with one same affordance;

determining a second feature of the second object according to the first feature of the second object and the reconstructed first feature of the second object; and outputting an image of the second object according to the second feature of the second object.

6. The method according to claim 5, wherein an acquisition method for the set of bases comprises:

randomly initializing one set of bases, by using a preset optimization algorithm, iteratively updating the set of bases by reducing difference information between a training image and a training image after correlation operation using the set of bases, and taking the updated set of bases as one set of bases which is learned and capable of capturing the common feature between different objects with one same affordance, wherein the optimization algorithm comprises an expectation-maximum algorithm or a gradient descent algorithm.

7. An object affordance detection apparatus, comprising:

a memory; and a processor coupled to the memory, the processor being configured to perform, based on instructions stored in the memory, an object affordance detection method, comprising:

acquiring a reference image and an image to be detected, the reference image comprising a person and a first object on which the person performs an action;

extracting features of the reference image and features of the image to be detected by using an image feature extraction network;

extracting action intention information of the person on the first object in the reference image according to the features of the reference image, comprising:

performing weighted operation on the features of the reference image according to a feature representation of the person in the reference image to obtain a first output;

performing weighted operation on the features of the reference image according to a feature representation of the first object in the reference image to obtain a second output;

performing a correlation operation on a pooled feature representation of the first object and the feature representation of the person, performing a convolutional processing of a result of the correlation operation to obtain a third output describing a related position of the action of the person on the first object;

performing multiplication and pooling on the third output and the first output to obtain first action intention sub-information; performing multiplication and pooling on the third output and the second output to obtain second action intention sub-information; and adding the first action intention sub-information and the second action intention sub-information to obtain an action intention code of the person on the first object in the reference image; and migrating the action intention information to the image to be detected and segmenting a second object capable of completing the action intention information from the image to be detected according to the action intention information of the person on the first object in the reference image and the features of the image to be detected, comprising:

performing a correlation operation on the action intention information of the person on the first object in the reference image and each position of the features of the image to be detected, and performing normalization to obtain a weight of each position; and performing multiplication on the weight of each position and the features of the image to be detected, and adding a result of the multiplication and the features of the image to be detected to obtain the second object which is segmented from the image to be detected and capable of completing the action intention information, wherein the second object is an object that has not been learned by an object affordance detection model, and is applied to scene understanding, action recognition, or human-computer interaction.

8. The apparatus according to claim 7, wherein:

the performing weighted operation on the features of the reference image according to a feature representation of the person in the reference image to obtain a first output comprises: performing a correlation operation on a pooled feature representation of the person in the reference image and each position of the features of the reference image, normalizing a result of the correlation operation to obtain a weight of each position, and performing multiplication on the weight of each position and the features of the reference image to obtain the first output;

or the performing weighted operation on the features of the reference image according to a feature representation of the first object in the reference image to obtain a second output comprises: performing a correlation operation on the pooled feature representation of the first object in the reference image and each position of the features of the reference image, normalizing a result of the correlation operation to obtain a weight of each position, and performing multiplication on the weight of each position and the features of the reference image to obtain the second output.

9. The apparatus according to claim 7, wherein:

the feature representation of the person in the reference image is obtained by performing multiplication on a bounding box of the person in the reference image and the features of the reference image; and the feature representation of the first object in the reference image is obtained by performing multiplication on a bounding box of the first object in the reference image and the features of the reference image.

10. The apparatus according to claim 7, the object affordance detection method further comprising:

performing reconstruction on a first feature of the second object by using one set of bases, the set of bases being capable of capturing a common feature between different objects with one same affordance;

determining a second feature of the second object according to the first feature of the second object and the reconstructed first feature of the second object; and outputting an image of the second object according to the second feature of the second object.

11. The apparatus according to claim 10, wherein an acquisition method for the set of bases comprises:

randomly initializing one set of bases, by using a preset optimization algorithm, iteratively updating the set of bases by reducing difference information between a training image and a training image after correlation operation using the set of bases, and taking the updated set of bases as one set of bases which is learned and capable of capturing the common feature between different objects with one same affordance, wherein the optimization algorithm comprises an expectation-maximum algorithm or a gradient descent algorithm.

12. An object affordance detection apparatus, comprising:

a feature extraction module configured to acquire a reference image and an image to be detected, the reference image comprising a person and a first object on which the person performs an action; and extract features of the reference image and features of the image to be detected by using an image feature extraction network;

an intention learning module configured to extract action intention information of the person on the first object in the reference image according to the features of the reference image, comprising:

performing weighted operation on the features of the reference image according to a feature representation of the person in the reference image to obtain a first output;

performing weighted operation on the features of the reference image according to a feature representation of the first object in the reference image to obtain a second output;

performing a correlation operation on a pooled feature representation of the first object and the feature representation of the person, performing a convolutional processing of a result of the correlation operation to obtain a third output describing a related position of the action of the person on the first object;

performing multiplication and pooling on the third output and the first output to obtain first action intention sub-information;

performing multiplication and pooling on the third output and the second output to obtain second action intention sub-information; and adding the first action intention sub-information and the second action intention sub-information to obtain an action intention code of the person on the first object in the reference image; and an intention migration module configured to migrate the action intention information to the image to be detected and segment a second object capable of completing the action intention information from the image to be detected according to the action intention information of the person on the first object in the reference image and the features of the image to be detected, comprising:

performing a correlation operation on the action intention information of the person on the first object in the reference image and each position of the features of the image to be detected, and performing normalization to obtain a weight of each position; and performing multiplication on the weight of each position and the features of the image to be detected, and adding a result of the multiplication and the features of the image to be detected to obtain the second object which is segmented from the image to be detected and capable of completing the action intention information, wherein the second object is an object that has not been learned by an object affordance detection model, and is applied to scene understanding, action recognition, or human-computer interaction.

13. The apparatus according to claim 12, further comprising:

a synergetic enhancement module configured to perform reconstruction on a first feature of the second object by using one set of bases, the set of bases being capable of capturing a common feature between different objects with one same affordance; and determine a second feature of the second object according to the first feature of the second object and the reconstructed first feature of the second object; and a decoding module configured to output an image of the second object according to the second feature of the second object.

14. A non-transitory computer-readable storage medium storing a computer program which, when executed by a processor, implements the steps of the object affordance detection method according to claim 1.

* * * * *